United States Patent [19]

Baumgarten

[11] Patent Number: 4,680,829
[45] Date of Patent: Jul. 21, 1987

[54] HOLLOW SHEET METAL UTENSIL HANDLE FASTENING ASSEMBLY

[75] Inventor: Rolf Baumgarten, Neunkirchen-Wiederstein, Fed. Rep. of Germany

[73] Assignee: Heinrich Baumgarten KG, Neunkirchen, Fed. Rep. of Germany

[21] Appl. No.: 806,154

[22] Filed: Dec. 6, 1985

[30] Foreign Application Priority Data

Dec. 13, 1984 [DE] Fed. Rep. of Germany ... 8436478[U]

[51] Int. Cl.⁴ .......................... B25G 3/26; B25G 3/30
[52] U.S. Cl. ........................ 16/114 A; 16/110 A; 16/DIG. 24; 403/260; 403/262
[58] Field of Search ............... 16/110 A, 114 A, 124, 16/DIG. 24; 220/94 R; 403/260, 261, 262

[56] References Cited

U.S. PATENT DOCUMENTS

| 3,661,296 | 5/1972 | Hamer | 16/110 A X |
| 4,008,822 | 2/1977 | Carroll | 16/110 A X |
| 4,032,032 | 6/1977 | Carroll et al. | 16/110 A X |

Primary Examiner—Fred Silverberg
Attorney, Agent, or Firm—Flynn, Thiel, Boutell & Tanis

[57] ABSTRACT

A hollow sheet metal handle for fastening to a welding bolt weldably secured to utensils. The welding bolt has a triangular or polygonal cross section and a bore having an internal thread. A shaped part of sheet metal is welded to the utensil in the connecting part of the hollow handle, which shaped part forms a front-side contact surface for the welding bolt. At least two plates are provided on the shaped part, which plates laterally guide the aluminum bolt. A bore for receiving a fastening screw is arranged in the contact surface of the shaped part.

8 Claims, 10 Drawing Figures

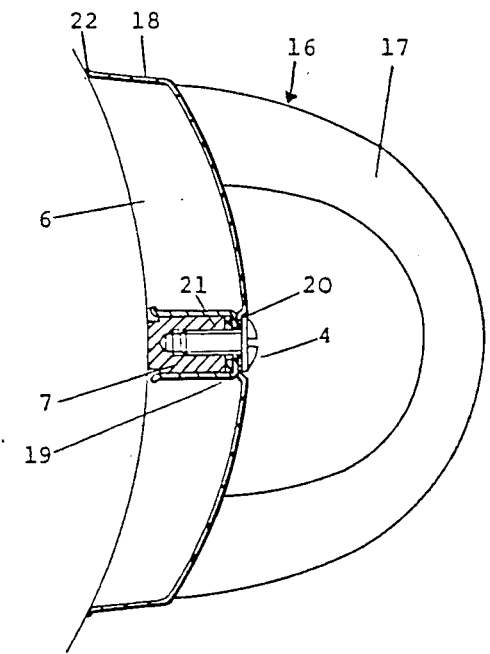
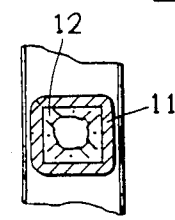
Fig. 9
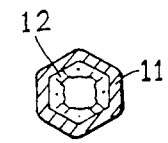
Fig. 10
Fig. 8 and 4,680,829

HOLLOW SHEET METAL UTENSIL HANDLE FASTENING ASSEMBLY

FIELD OF THE INVVENTION

The invention relates to a hollow sheet metal handle for fastening to welding bolts, which can be welded to utensils, having a triangular or polygonal cross section and having a bore which is provided with a thread.

BACKGROUND OF THE INVENTION

Pots, as for example aluminum pots or pots of a rust-free steel, are among others equipped with hollow sheet metal handles, which are secured by rivets to the edge of the pot. These rivets, however, have the disadvantage that they, on the one hand, can be noticed interferingly on the inside of the pot and, on the other hand, also do not provide a lasting solid connection between the pot and the handle. A direct welding of the handle which is formed of sheet metal to the aluminum pot is not possible, since here a welding connection cannot be created. It is furthermore known to fasten plastic handles to the aluminum pot, which plastic handles are secured to an aluminum welding bolt welded to the aluminum pot and which has a polygonal shape in cross section. Relative rotation between the pot and the handle is prevented by providing a cavity in the plastic handle corresponding in shape to the dimensions of the welding bolt. The plastic handle is fastened to the aluminum pot by a screw, which at the one end engages the welding bolt and at the other end rests on the plastic handle and presses same against the untensil wall. The disadvantage of a plastic handle consists in same not being heat-resistant and also, in the long run, is not dishwasher-proof. Moreover, this type of fastening, by means of a welding bolt and screw, shows in aluminum pots the disadvantage that at a high tightening moment on the screw, which is needed for a safe and clearance-free fastening of the handle on the utensil can cause, namely, a deformation of the, as a rule, relatively thin and soft utensil wall. The same manufacturing difficulties occur during the fastening of plastic handles to rust-free utensils.

The basic purpose of the invention is to provide a hollow handle made of a heat-resistant sheet metal, which can be connected through a welding bolt, which can be fastened on the utensil, to the utensil, without causing deformation of the utensil wall, whereby the handle may be a rod or a side handle.

In the case of an inventively constructed handle, a shaped sheet metal part is thus welded into the connecting part of the hollow handle on the pot. This shaped part forms a contact surface for the welding bolt. This has the advantage that during a tightening of the screw, there occurs a relative support between the handle and the screw bolt of aluminum, whereby the handle does not need to rest with its front end on the sidewall of the aluminum pot. This assures that no force is applied by the handle onto the wall of the pot, which can lead to a deformation of the pot.

Two plates are furthermore provided on the front part of the shaped part, which plates grip laterally around the welding bolt and in this manner prevent a relative rotation between the handle and the welding bolt and thus the pot. A bore is furthermore constructed in the contact surface of the shaped part on the bolt, through which bore extends the fastening screw, the head of which or the special contact surface of which rests on the side of the shaped part remote from the bolt. The screw is advantageously constructed with an extended rod, which makes possible a simpler fastening of the handle on the utensil, since the screw must be operated through the rear open end of the handle.

The shaped part is provided advantageously with a cup-shaped construction, into which engages the welding bolt, so that same is supported on all sides, whereby at the same time holding forces can also be transmitted through the side surfaces on the bolt onto the handle.

Since on the one hand relatively large tolerances during fastening of the handle must be balanced and on the other hand a lock against an unintended loosening of the screw is obtained, according to a further suggestion of the invention upstanding tabs are struck from the contact surface on the shaped part, which tabs come to rest on the bolt. During a tightening of the screw, same is sufficiently turned until the necessary contact force and the desired distance of the front edge of the handle from the sidewall of the utensil is attained.

BRIEF DESCRIPTION OF THE DRAWINGS

Several exemplary embodiments of the invention are described in greater detail hereinafter in connection with the drawings, in which:

FIGS. 8, 9 and 10 are partially cross-sectioned views of differently shaped side handle and cup-shaped parts.

DETAILED DESCRIPTION

Figure 1:
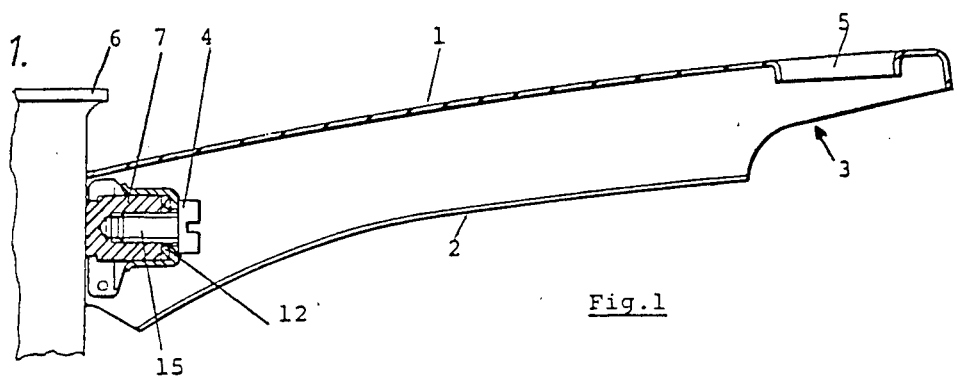
FIG. 1 is a cross-sectional side view of an inventively constructed hollow handle.

Reference numeral 1 identifies in the figures an inventively constructed hollow handle, which is illustrated in the form of a rodlike handle. The handle 1 is formed of a one-piece sheet-metal plate and is welded together at its seam area 2. The rear end 3 of the handle is constructed open, so that through this end a screw driver can be introduced up to the fastening screw 4. An opening 5 is furthermore constructed in the rear end of the handle 1.

The hollow handle 1 is secured to the utensil 6, namely, by a welding bolt 7 which consists of aluminum and is welded to the utensil 6 which also consists of aluminum. If the utensil consists of a rust-free steel, then the welding bolt is to also consist of a rust-free steel. The cross section of the welding bolt is constructed square and has only slightly smaller outside dimensions than the inside dimensions of the cup-shaped part 8 of a shaped part 9 which is welded into the inside of the hollow handle 1.

Figure 4:
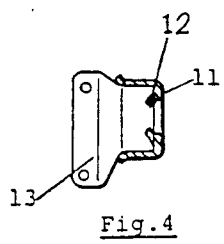
FIG. 4 is a partially cross-sectioned side view of a shaped part which is inserted in the handle.
Figure 5:
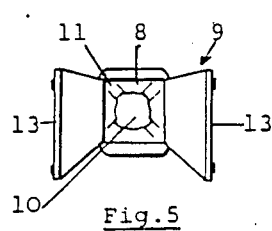
FIG. 5 is a front view of the shaped part according to FIG. 4.
Figure 6:
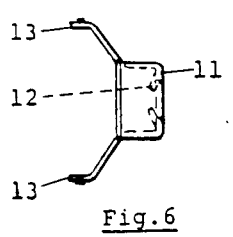
FIG. 6 is a top view of the shaped part which is shown in FIG. 5.

The shaped part is illustrated in FIGS. 4 to 6. The shaped part 9 consists of a cup-shaped part 8 having a bottom wall with a bore 10 for the passage of the fastening screw 4. Tabs 12, against which the welding bolt 7 rests, are furthermore provided in the contact surface 11 of the cup-shaped part 8.

Figure 7:
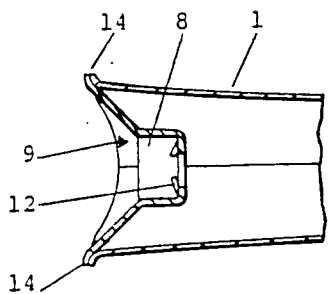
FIG. 7 is a cross-sectional top view of an inventively constructed hollow handle, having a welded-in shaped part.

Two further plates 13 are formed laterally on the cup-shaped part 8, which plates 13 are welded to the side wall of the hollow handle 1 or, however, as this is illustrated in FIG. 7, to the front side 14 of the handle 1.

For mounting of the handle 1, same is moved over the welding bolt 7 which is already welded to the utensil 6 and the fastening screw 4 is thereafter screwed through the bore 10 into the tapped hole 15 which is constructed in the welding bolt 7. The projecting tabs 12 serve, on the one hand, as tolerance-balancing elements and, on the other hand, as a protection against relative rotation between the handle 1 and the fastening screw 4. The screw 4 is sufficiently tightened until the front sides 14 of the handle 1 contact the edge of the utensil. The contact forces between the handle 1 and the welding bolt are received by the tabs 12 of the shaped part 9, so that the handle can rest practically pressureless on the utensil wall of the utensil 6. It is furthermore guaranteed through the spring action of the tabs 12 that the screw 4 cannot loosen unintentionally. For this reason the entire shaped part 9 is preferably manufactured of a spring-hard material.

Figure 2:
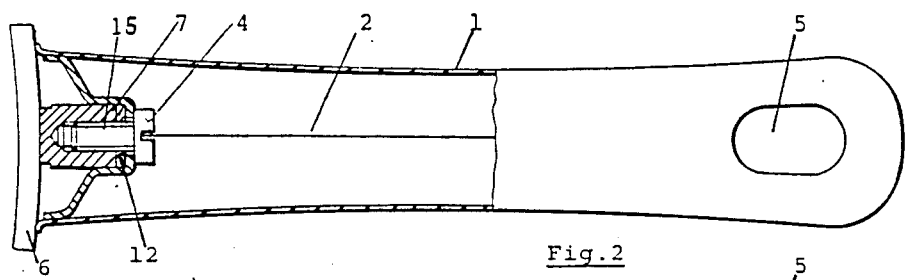
FIG. 2 is a partially cross-sectioned top view of the exemplary embodiment which is illustrated in FIG. 1.
Figure 3:
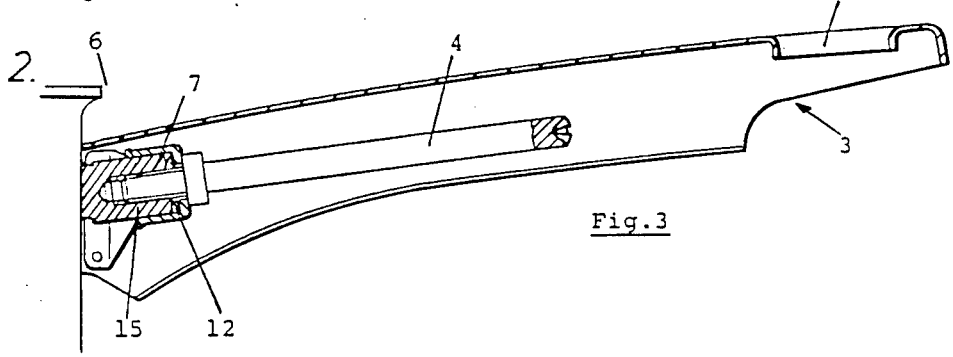
FIG. 3 is a side view similar to FIG. 1, however, having a differently designed fastening screw.

A fastening screw 4 is illustrated in FIG. 3, which screw differs from the exemplary embodiment according to FIGS. 1 and 2 in such a manner that the end of the screw head is extended so that same can be gripped easier from the rear end 3 of the handle 1.

The welding bolt 7 is gripped around also laterally due to the cup-shaped construction of the shaped part 9. This does not only have the advantage of an improved protection against relative rotation but moreover also the advantage that carrying forces can be transmitted also through the sidewall of the welding bolt onto the hollow handle 1.

The hollow handle which is illustrated in FIG. 8 is a side handle 16, which is secured also be means of a welding bolt 7 and a fastening screw 4 to the aluminum utensil 6.

The rear end 17 of the side handle 16 is formed of sheet metal in a conventional manner and is connected to a dome-shaped part 18, which in the area of the welding bolt 7 is provided with a cup-shaped part 19. The cup-shaped part 19 constructed to a polygonal shape and corresponds with the shape of the cup-shaped part 8 according to the exemplary embodiments 1 to 7. Tabs 21 are also provided in the contact surface 20 of the cup-shaped part 19, which tabs rest on the welding bolt 7. The depth of the cup-shaped part 19 is conformed to the height of the welding bolt, so that when the screw is tightened, the ends of the cup-shaped part are ever so slightly spaced from the wall of the utensil 6. Furthermore, the shape of the ends 22 of the dome-shaped part 18 are conformed to the shape of the utensil such that, when the fastening screw 4 is tightened, these ends rest only with a small amount of pressure on the utensil wall 6.

The embodiments of the invention in which an exclusive property or privilege is claimed are defined as folows:

1. In a handle assembly for facilitating a fastening of a hollow sheet metal handle to the side wall of a utensil, the improvement comprising a welding bolt adapted to be weldably secured to the side wall of the utensil and project outwardly therefrom, said welding bolt having a polygonal cross section and an internally threaded bore in a contact surface on said welding bolt facing away from the utensil, the axis of said bore extending transversely of the side wall of the utensil, a sheet metal shaped part and welding means for fixedly attaching said sheet metal shaped part to said sheet metal handle, said sheet metal shaped part having a means defining a recess having a shape conforming to the shape of said welding bolt and adapted to receive said welding bolt therein, said sheet metal shaped part also having at least two plates forming extensions of at least two walls of said means defining a recess, said plates extending toward the side wall of said utensil and straddling said welding bolt, said recess means having a bottom wall with an opening therethrough, a fastening screw received through said opening and threadedly engaged with said internally threaded bore, so that upon a tightening of said screw, a securement of said sheet metal handle to the side wall of said utensil will be effected, said screw effecting a drawing of said bottom wall of said recess means into engagement with said contact surface to thereby prevent said plates and said sheet metal handle from engaging the side wall of said utensil with an undue amount of force to cause deformation of the utensil wall.

2. The handle assembly according to claim 1, wherein said recess means closely encloses said welding bolt on all sides.

3. The handle assembly according to claim 1, wherein said welding means secures said plates to said hollow sheet metal handle.

4. The handle assembly according to claim 3, wherein said plates are weldably secured to a surface on said hollow sheet metal handle facing the utensil.

5. The handle assembly according to claim 1, wherein said bottom wall has at least one tab projecting toward said welding bolt and engaging said contact surface and said screw so that as said screw draws said contact surface toward said bottom wall, said tab wll be flexed into tighter engagement with said screw to thereby effect an increase in the friction between said tab and said screw and a preventing of an involuntary loosening of said screw.

6. The handle assembly according to claim 1, wherein said sheet metal shaped part consists of a spring-hard material.

7. The handle assembly according to claim 1, wherein the utensil is made of aluminum, and wherein said welding bolt is also made of aluminum.

8. The handle assembly according to claim 1, wherein the utensil is made of a rust-free steel, and wherein said welding bolt is also made of a rust-free steel.

* * * * *